Dec. 4, 1962     A. MAURER ETAL     3,066,779
ONE-WAY SPRAG TYPE CLUTCH
Filed April 20, 1960     3 Sheets-Sheet 1

INVENTORS
Albrecht Maurer
Emil Giese
BY
Michael S. Striker
Attorney

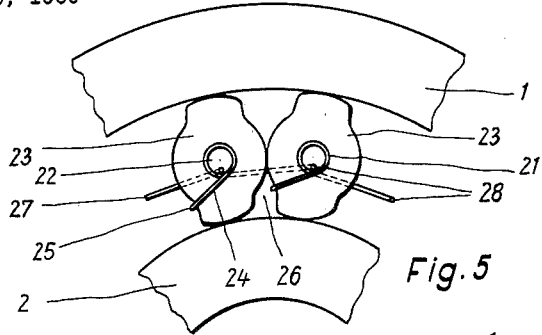
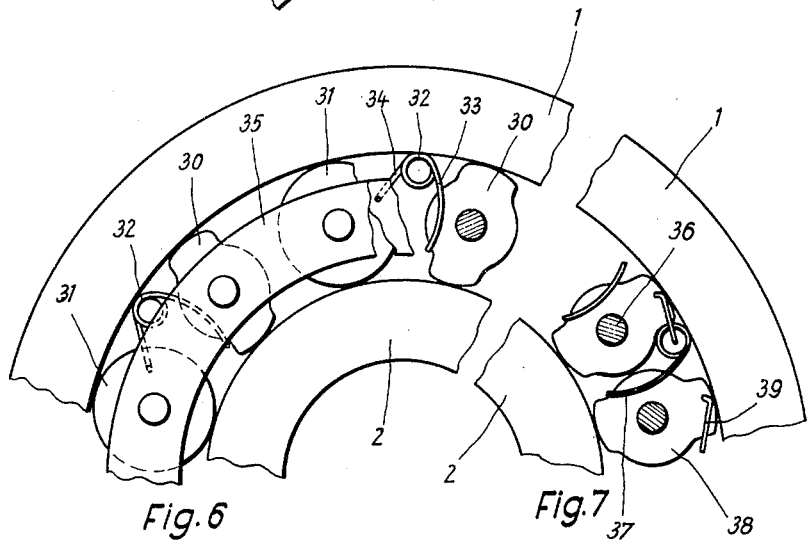
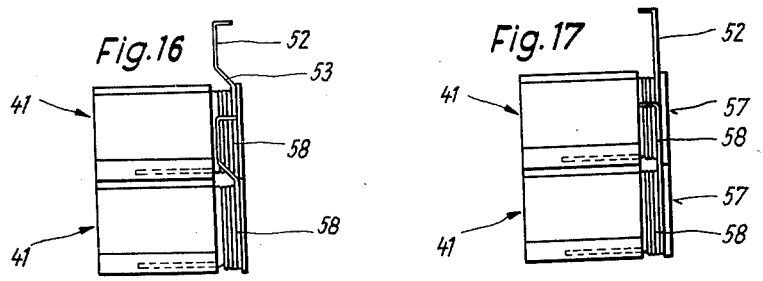

Dec. 4, 1962   A. MAURER ETAL   3,066,779
ONE-WAY SPRAG TYPE CLUTCH
Filed April 20, 1960   3 Sheets-Sheet 3

INVENTORS
Albrecht Maurer
Emil Giese
BY
Michael S. Striker
Attorney 3,066,779
ONE-WAY SPRAG TYPE CLUTCH
Albrecht Maurer and Emil Giese, both of Bad Homburg vor der Hohe, Germany, assignors to Ringspann Albrecht Maurer K.G., Bad Homburg vor der Hohe, Germany, a firm of Germany
Filed Apr. 20, 1960, Ser. No. 23,403
Claims priority, application Germany Apr. 25, 1959
9 Claims. (Cl. 192—45.1)

The present invention relates to a one-way or freewheel clutch of the sprag type, and more particularly to such a clutch which comprises a pair of cylindrical races which are separated by an annular space, and a plurality of tiltable sprags disposed within this space and supporting each other in the peripheral direction, while their contact or gripping surfaces are held in constant engagement with the cylindrical surfaces of the inner and outer races by the action of a spring which exerts a torque upon the individual sprags.

For producing the required torque for tilting the sprags, the one-way clutches of this type as are presently known usually include at least one annular coil spring which extends through all of the sprags in the peripheral direction by either passing through central bores or through recesses in the edge portions of the sprags. This annular spring usually acts upon the sprags by exerting a force upon them in a radial direction toward the outside, and in such a manner that the point of application of this force is disposed eccentrically to the tilting axis of each individual sprag so that each sprag will be subjected to a torque which maintains the contact or gripping surfaces thereof in constant engagement with the inner and outer races. The use of such an annular spring which is common for all of the sprags has the disadvantage that the sprags must be provided either with bores which extend in the peripheral direction or with marginal recesses, and that the spring action will be unevenly distributed upon the individual sprags so that, when the clutch engages, some of the sprags will at first be subjected to a greater load than others. In order to distribute the spring action upon the sprags at least at some degree of uniformity, it has been necessary to apply a relatively strong spring which, however, has the disadvantage that the pressure of the contact or gripping surfaces upon the races will be unduly increased with the result that the wear upon the clutch will also become excessive and necessitate a reduction in the relative speeds at which such a clutch may be used. The use of such a spring has the further disadvantage that, aside from exerting the desired tilting torque, it also exerts upon each individual sprag an undesirable radial force. In addition, it has been found that the relatively high weight of such a strong spring also has an unfavorable effect upon the clutch, especially at the high speeds at which such a clutch is usually running.

It is the principal object of the present invention to overcome the mentioned disadvantages of presently utilized one-way clutches of the sprag type.

More particularly, it is an object of the invention to provide a one-way clutch in which the torques which are exerted upon the individual sprags are all of the same strength.

Another object of the invention is to provide a one-way clutch of the sprag type in which the spring weight is considerably reduced as compared with the weight of the common spring which was applied in previous sprag-type clutches.

A further object of the invention is to provide a clutch of the mentioned type in which the tilting torque which is exerted by the spring upon each sprag is made as small as possible.

A still further object of the invention is to provide a sprag-type clutch in which the radial forces acting upon the sprags are made as small as possible or are even eliminated entirely.

For attaining these objects, the invention consists in providing each individual sprag of the one-way clutch with at least one separate torsion coil spring with free spring arms, and in mounting this spring so that the axis of the coil thereof extends parallel to the axis of rotation of the clutch. One arm of this spring then acts upon the sprag eccentrically to the tilting axis thereof in order to produce a tilting torque, while the other spring arm acts upon a part which rotates together with the outer race of the clutch.

The present invention may be applied in numerous different embodiments. Thus, according to a first embodiment, the coil of the spring is helically wound and mounted in a bore in the sprag which extends coaxially to the tilting axis of the sprag. One shorter spring arm may then engage with the wall of a slot which is provided in one end surface of the sprag, while the other longer arm extends up to the spring-receiving bore in the next sprag and its free end is bent at an angle and extends in the axial direction into the coil of the spring in this adjacent sprag.

By the use of such individual springs it is possible to reduce the total weight of all of the springs, as compared with the considerable weight of the common spring required in the previous sprag-type clutches, and to make the required torque acting upon the individual sprags more uniform and of a lower strength. Furthermore, the use of separate springs for each sprag also considerably facilitates the method of manufacturing the sprags.

If the present invention is applied to a one-way clutch of the sprag type which is designed so that the lateral bearing surfaces of the sprags as well as of the outer contact or gripping surfaces thereof form circular cylindrical surfaces which have a common center line of curvature, and in which the center of gravity of each sprag lies within this common center line, the additional advantage will be attained that, due to the arrangement of each spring coil in a bore of the sprag which is concentrical to the tilting axis of the sprag, the position of the center of gravity of each sprag will remain the same at any angular position assumed by the sprag. When applying sprags of such a design, the use of torsion coil springs according to the invention in which one of the free ends of each spring is disposed within the coil of the adjacent spring will result in the additional advantage that, as long as the clutch is not in engagement, practically no radially directed forces and no torques which are produced by centrifugal force will act upon the sprags, but only the torque which is exerted upon them by the springs. This is due to the fact that the radial force which is exerted upon each sprag by its own spring will be neutralized by the action upon this sprag by the free arm of the adjacent spring. Each sprag will therefore be applied against the cylindrical surfaces of the inner and outer races only by the torque which is produced by the spring, and the position of the individual sprags will not be affected by any other forces.

According to the invention it is also possible to mount the coil of each spring in the gap which is formed between two adjacent sprags and the outer race of the clutch, and in such a manner that one arm of the spring extends parallel to the front surface of the sprag and the bent-end portion of this spring arm is inserted in the axial direction into the gap between the two adjacent sprags and the inner race where it engages with the sprag at a point which is disposed eccentrically to the tilting axis of the sprag.

This manner of mounting the individual springs has the advantage that the sprags do not have to be provided with any axial bores for receiving the springs, and it is also applicable if the entire set of sprags is partly enclosed by and guided within a cage, in which event the individual sprags and, if provided, the guide rollers between the adjacent sprags are rotatably mounted within the cage.

The free other arm of each spring may then either engage on the inner cylindrical surface of the outer race or be inserted into the coil of the adjacent spring or, if a cage is applied, it may be connected to the cage.

According to the invention it has further been found that it will be of advantage to bend the one spring arm and to pass it back through the inside of the spring coil in the axial direction thereof, and then to bend the projecting end of this arm at a right angle to the axis of the coil so that the ends of both spring arms will be disposed at the same side of the coil.

Such a spring arrangement considerably facilitates the installation of the individual springs since they can all be inserted from one side of the clutch. If the spring coils are inserted into axial bores in the sprags, the longer arm of each spring is preferably placed within the slot in the front surface of the sprag without touching the side walls or the bottom of the slot, and it is then held within the slot by an annular flange which is mounted on and rotates with the outer race of the clutch, while the shorter spring arm engages on the bottom of the slot.

If the coil springs are designed so that both spring arms are on the same side of the sprags, it is also possible according to the invention to provide each sprag with a pair of coil springs which are disposed behind each other in the axial direction thereof, so that the spring arms of both springs embrace the respective sprag. This arrangement may be applied either if the spring coils are mounted in axial bores in the sprags or if they are mounted in the outer gaps between the adjacent sprags.

Instead of mounting the spring coils in axial bores in the sprags or in the gaps between adjacent sprags, it has further been found that it is very advantageous if the coils are mounted on special supporting pins which project from the front side of the sprags coaxially with the tilting axis thereof. For producing the torque which acts upon each individual sprag, one spring arm may then be supported by the adjacent sprag, while the other spring arm acts upon the sprag which carries the coil of the respective spring. The application of such an arrangement of the spring coils on supporting pins is particularly of advantage if very great coupling forces are to be transmitted and if the sprags which are provided with longitudinal bores are then no longer capable of withstanding the radial pressures which act upon the sprags, or if by the arrangement of the springs between the sprags, the highest possible differential speed might be unduly limited. If the springs are mounted in this manner, it is advisable to extend one arm of each spring up to the adjacent sprag and tangentially to the circle of rotation of the clutch, and to connect it to the adjacent sprag so as to act in the radial direction thereon, while the other arm of the spring, if the latter forms a helically wound wire spring, engages directly on the sprag at a point which is disposed eccentrically to the tilting axis between one of the contact or gripping surfaces and one of the lateral supporting surfaces of the sprag.

If the spring coil is mounted on a supporting pin, the invention further provides that this coil may also be made of a spirally wound wire or flat strip, the inner end of which is rigidly connected to the supporting pin.

These as well as other objects, features, and advantages of the present invention will become further apparent from the following detailed description thereof, particularly when the same is read with reference to the accompanying drawings, in which—

FIGURE 5 shows a similar view of a third modification of the clutch;

FIGURE 6 shows a similar view of a fourth modification of the clutch;

FIGURE 7 shows a similar view of a fifth modification of the clutch;

Figure 8:
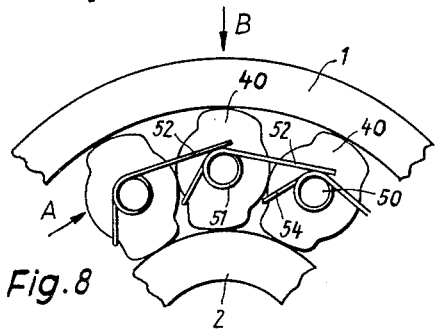
FIGURE 8 shows a partial front view of a sixth modification of the clutch.
Figure 11:
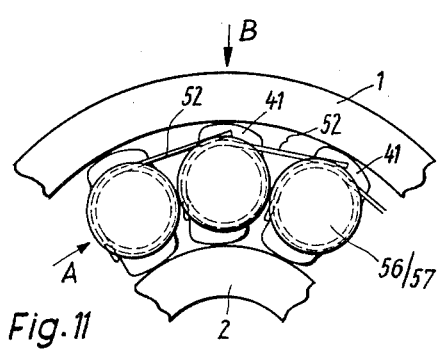
Figure 14:
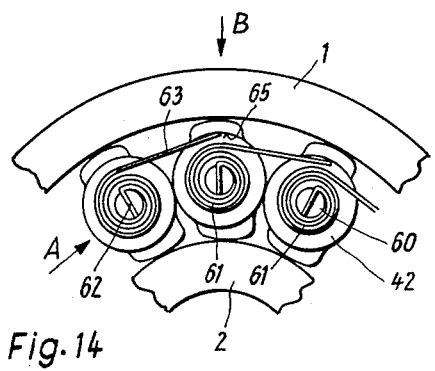
Figure 9:
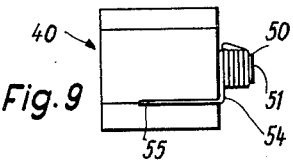
FIGURE 9 shows a view of an individual sprag according to FIGURE 8 taken in the direction of the arrow A therein.
Figure 10:
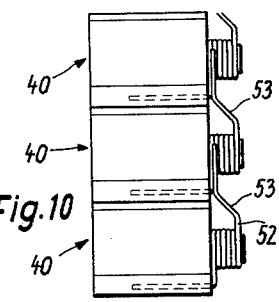
FIGURE 10 shows a view of the sprags according to FIGURE 8, taken in the direction of the arrow B therein after the outer race of the clutch has been removed.
Figure 12:
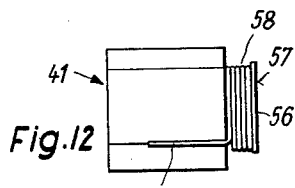
Figure 13:
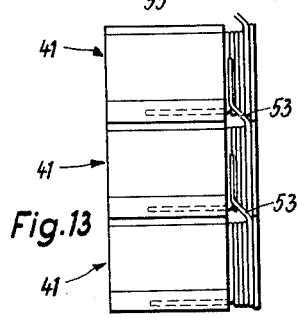
Figure 15:
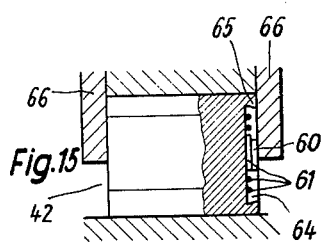

FIGURES 11, 12, and 13 show views similar to those of FIGURES 8 to 10, respectively, but of a seventh modification of the one-way clutch;

FIGURE 14 shows a view similar to FIGURE 8 of an eighth modification of the clutch;

FIGURE 15 shows a view similar to FIGURE 9, but partly in cross section, of an individual sprag according to FIGURE 14; while FIGURES 16 and 17 shows two views of sprags similar to those according to FIGURE 13 but provided with differently shaped springs.

Figure 1:
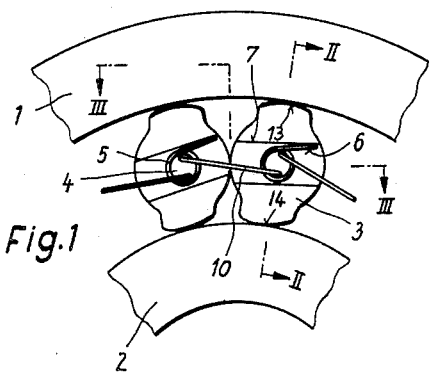
FIGURE 1 shows a partial front view of a sprag-type one-way clutch according to one embodiment of the present invention.

Referring now to the drawings, the one-way sprag-type clutch according to all of the embodiments of the invention as illustrated in FIGURES 1, 4 to 8, 11, and 14, respectively, comprises an outer clutch member or race 1 and an inner clutch member or race 2 between which a plurality of sprags are mounted. According to the first embodiment as shown in FIGURE 1, each sprag 3 of the clutch has a bore 4 which is disposed coaxially to the tilting axis of the sprag and contains a helically wound torsion coil spring 5. One free end of this spring forms an arm 6 which engages on a wall 7 of a slot 8 which is provided in the front side of the sprag. The other end of the spring forms an arm 9 which is bent back so as to pass through the inside of the coil in the axial direction thereof, and it is then bent at a right angle to the axis of the coil. This portion 10 of spring arm 9 extends substantially in a straight direction up to bore 4 of the adjacent sprag 3 where its free end 11 is bent back in the axial direction into coil 5 of the spring in this adjacent sprag. The shorter spring arm 6 then engages on the bottom 12 of slot 8, while part 10 of the other spring arm 9 extends along slot 8 without touching the walls 7 or the bottom 12 thereof. The usual annular flange (not shown) on such a clutch which is rotatable with the outer race 1 thereof holds the part 10 of spring arm 9 within the slot and thus also maintains coil 5 of the spring within bore 4. Spring arm 6 produces the desired torque so that the outer gripping or contact surface 13 and the inner contact surface 14 of the respective sprag will be held constantly in engagement with the cylindrical surfaces of the outer race 1 and the inner race 2, respectively. The radial force which is produced by the coil spring will be neutralized by the opposed, counteracting radial force which is produced within the same coil by the spring arm 11 of the adjacent spring.

Figure 4:
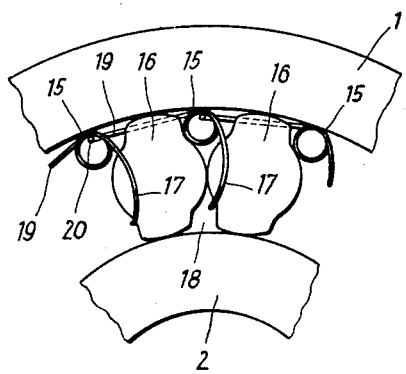
FIGURE 4 shows a view similar to FIGURE 1 of a modification of the clutch according to the invention.

FIGURE 4 illustrates a different spring arrangement in which the spring coils 15 are disposed within the gaps between two adjacent sprags 16 and the outer race 1. One spring arm 17 first extends parallel to the front surface of the sprag and it is then bent back at a right angle so as to extend in the axial direction into gap 18 between two adjacent sprags 16 and the inner race 2, where it engages on the sprag at a point eccentrical to the tilting axis thereof. The other spring arm 19 is disposed at the opposite side of the sprag and extends substantially straight to the adjacent coil spring, where its free end 20 is bent at a right angle to extend in the axial direction into the coil of this spring. The radial forces acting upon each individual sprag of this embodiment substantially neutralize each other in a similar manner as described with reference to FIGURE 1, so that only the tilting torque remains which is produced by the spring.

FIGURE 5 illustrates a modification of the invention which is similar to the embodiment according to FIGURE 1 insofar as the spring coils 21 are also mounted in bores 22 in the sprags 23. Spring arm 24 at the front side of each sprag has a free end 25 which is bent back in the axial direction into the gap 26 between two adjacent sprags 23 and the inner race 2, and it engages on the sprag in which its coil is mounted. The other spring arm 27 at the rear side of the sprag has a free end 28 which is bent over in the axial direction and is inserted into the coil of the adjacent spring.

FIGURE 6 shows a one-way clutch in which the sprags 30 are rotatably mounted on a cage 35 and between rollers 31. Spring coils 32 are disposed similarly as in FIGURE 4 within the outer gaps between each sprag 30 and an adjacent roller 31, and one spring arm 33 engages on the sprag, while the other arm 34 is connected to cage 35.

Figure 2:
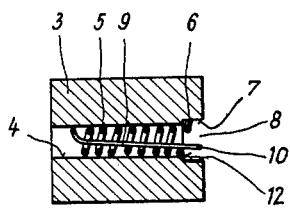
FIGURE 2 shows a radial section of a sprag, taken along line II—II of FIGURE 1.
Figure 3:
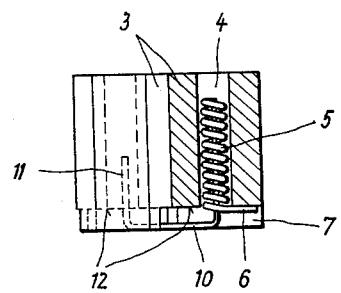
FIGURE 3 shows a cross section of a sprag taken along line III—III of FIGURE 1.

FIGURE 7 illustrates a spring arrangement similar to that as shown in FIGURE 4, in which, however, the one spring arm 39 passes back through the spring coil to the same side where the other arm 37 is located, as described with reference to FIGURES 1 to 3. This spring arm 37 then engages on sprag 38 in the same manner as shown in FIGURE 4, while the end of the other arm 39 engages on the inner surface of the outer race 1 of the clutch.

In the further embodiment of the one-way clutch according to the invention as illustrated in FIGURES 8 to 10, each sprag 40 is provided at the front side with a supporting pin 50 which extends coaxially with the tilting axis thereof and carries a helically wound wire spring 51. One arm 52 of this spring extends in a tangential direction to the adjacent sprag where it engages on that spring coil 51 which is mounted on the supporting pin 50 of this adjacent sprag and acts upon coil 51 in a radial direction toward the center of pin 50. For this purpose, spring arm 52 is provided with an inwardly cranked portion 53, as shown in FIGURE 10. The other spring arm 54 extends at first obliquely toward the inner race 2 along the front surface of the sprag, and its end 55 is then bent at a right angle toward the sprag so as to extend substantially parallel to the axis of rotation of the clutch and to engage on the sprag along a line intermediate the lateral bracing surface and the inner contact or gripping surface of the sprag. Spring arm 55 therefore tends to tilt the sprag in a counterclockwise direction and thereby maintains the opposite contact surfaces of the sprag constantly in engagement with the cylindrical contact surfaces of the inner and outer races.

The further embodiment of the invention as illustrated in FIGURES 11 to 13 differs from that according to FIGURES 8 to 10 merely by the fact that the spring supporting pin 56 has a greater diameter and that it is provided on its outer end with a flange or disk 57 of a diameter approximately equal to the diameter of the cylindrical central part of sprag 41. Since flange 57 is usually circular, it may be made of a diameter exactly equal to the diameter of the curvature of the two lateral bracing surfaces of the sprag, provided that these two surfaces have an equal diameter of curvature. In such a case, the flanges or disks 57 on the adjacent sprags 41 will be constantly in engagement with each other. However, primarily it is the purpose of flanges 57 to restrict the coil springs 58 toward the front.

When applying this embodiment of the invention, it may occur that the free arm 52 of the spring on one sprag may wedge between the turns of the spring coil of the adjacent sprag and thereby increase the friction on this adjacent sprag and reduce the free movability thereof about its tilting axis. In order to prevent such a wedging action, it has been found advisable to bend the extreme outer end of spring arm 52 once more in a direction parallel to the axis of the sprag, as illustrated in FIGURE 16, so that the bent end portion of the spring will then rest either on the coil turns of the adjacent spring or on the free arm 52 thereof. Instead of cranking the spring arm 52 inwardly, as shown at 53 in FIGURE 16 and bending the outer end thereof away from the adjacent sprag, it is also possible as shown in FIGURE 17 to leave the arm itself straight and to bend its outer end toward the adjacent sprag.

In the further modification of the invention, as illustrated in FIGURES 14 and 15, the supporting pin 60 on each sprag carries a spirally wound spring 61, for example, of a circular cross section. The supporting pin 60 is then provided with a transverse bore or a slot into which the inner end 62 of the spring is inserted so as to be nonrotatably connected to the pin.

FIGURE 15 also illustrates that coil 61 of the spring of this embodiment may be inserted into a recess 64 in the front surface of the sprag. This recess 64 is preferably made of such a diameter that it will be open at both sides so that the end of spring arm 63 may extend into recess 64 of the adjacent sprag and will there engage on the remaining wall portion 65 of sprag 42 by acting thereon in a radially outward direction. Since in this event the spirally wound spring exerts a torque in the clockwise direction upon the sprag, the one-way clutch according to FIGURES 14 is designed to permit the outer race 1 of the clutch to rotate freely in the opposite direction to the outer race of the clutches according to the embodiments as previously described.

The lateral support of the individual springs by the wall of recess 64 in each sprag may be further improved by providing one or both races with outer overlapping disks or flanges 66, as frequently applied in freewheel couplings. Oviously, for this purpose it is also possible to provide the spring supporting pin 60 with a flange or projecting disk 57 as shown in FIGURES 11 to 13. Furthermore, it is evident that, instead of providing a spirally wound spring with an increasing diameter in the embodiment according to FIGURES 14 and 15, it is also possible to utilize a screw-shaped coil spring, as applied in the embodiments according to FIGURES 1 to 13. It is therefore in this case possible to mount the spring so that the free arm thereof engages on the remaining wall portion 65 of recess 64 rather than on the coil of the spring on the adjacent sprag.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A one-way sprag type clutch comprising, in combination, an outer race having a cylindrical inner surface; an inner race having a cylindrical outer surface, said surfaces defining between themselves an annular space; a plurality of tiltable sprags located in said annular space next to each other and having each inner and outer contact surfaces respectively abutting against said cylindrical inner and outer race surfaces, and each having a pair of oppositely arranged cylindrical abutting surfaces respectively abutting against corresponding abutting surfaces of adjacent sprags, each of said sprags being formed with a spring retaining means; and a single helical coil spring mounted on each of said sprags and tightly engaging with all the coils thereof said spring retaining means, said coil spring having a first spring arm engaging the sprag on which said spring is mounted for imparting a torque upon said one sprag so as to maintain the contact surfaces thereof in constant engagement with said cylindrical surfaces of said inner and outer races, and having a second spring arm engaging the sprag adjacent said one sprag so as to exert on the latter a pressure directed substantially in a radial direction of said races so that the torque imparted to each sprag by the spring mounted thereon will be independent of the torque exerted by the remaining springs on the remaining sprags.

2. A one-way sprag type clutch comprising, in combination, an outer race having a cylindrical inner surface; an inner race having a cylindrical outer surface, said surfaces defining between themselves an annular space; a plurality of tiltable sprags located in said annular space next to each other and having each inner and outer contact surfaces respectively abutting against said cylindrical inner and outer race surfaces, and each having a pair of oppositely arranged cylindrical abutting surfaces respectively abutting against corresponding abutting surfaces of adjacent sprags, each of said sprags being formed with a spring retaining means, said outer contact surface and said pair of oppositely arranged abutting surfaces having a common axis of curvature and said spring retaining means extending along said common axis; and a single helical coil spring mounted on each of said sprags and tightly engaging with all the coils thereof said spring retaining means, said coil spring having a first spring arm engaging the sprag on which said spring is mounted for imparting a torque upon said one sprag so as to maintain the contact surfaces thereof in constant engagement with said cylindrical surfaces of said inner and outer races, and having a second spring arm engaging the sprag adjacent said one sprag so as to extert on the latter a pressure directed substantially in a radial direction of said races so that the torque imparted to each sprag by the spring mounted thereon will be independent of the torque exerted by the remaining springs on the remaining sprags, each sprag including the coil spring mounted thereon having a center of gravity located on said common axis so that the torque imparted to each sprag will be independent of centrifugal forces acting on the sprags during rotation of the clutch.

3. A one-way sprag type clutch comprising, in combination, an outer race having a cylindrical inner surface; an inner race having a cylindrical outer surface, said surfaces defining between themselves an annular space; a plurality of tiltable sprags located in said annular space next to each other and having each inner and outer contact surfaces respectively abutting against said cylindrical inner and outer race surfaces, and each having a pair of oppositely arranged cylindrical abutting surfaces respectively abutting against corresponding abutting surfaces of adjacent sprags, said outer contact surface and said pair of oppositely arranged abutting surfaces having a common axis of curvature and each of said sprags being formed with a cylindrical bore extending along said axis; and a single helical coil spring mounted on each of said sprags in said bore and tightly engaging with all the coils thereof the cyindrical bore surface, said coil spring having a first spring arm engaging the sprag on whiceh said spring is mounted for imparting a torque upon said one sprag so as to maintain the contact surfaces thereof in constant arrangement with said cylindrical surfaces of said inner and outer races, and having a second spring arm engaging the sprag adjacent said one sprag so as to exert on the latter a pressure directed substantially in a radial direction of said races so that the torque imparted to each sprag by the spring mounted thereon will be independent of the torque exerted by the remaining springs on the remaining sprags, each sprag including the coil spring mounted thereon having a center of gravity located on said common axis so that the torque imparted to each sprag will be independent of centrifugal forces acting on the sprags during rotation of the clutch.

4. A one-way sprag type clutch comprising, in combination, an outer race having a cylindrical inner surface; an inner race having a cylindrical outer surface, said surfaces defining between themselves an annular space; a plurality of tiltable sprags located in said annular space next to each other and having each inner and outer contact surfaces respectively abutting against said cylindrical inner and outer race surfaces, and each having a pair of oppositely arranged cylindrical abutting surfaces respectively abutting against corresponding abutting surfaces of adjacent sprags, said outer contact surface and said pair of oppositely arranged abutting surfaces having a common axis of curvature and each of said sprags being formed with a cylindrical projection projecting coaxial with said common axis from one end face of said sprag; and a single helical coil spring mounted on each of said sprags tightly wound about said projection and having a first spring arm engaging the sprag on which said spring is mounted for imparting a torque upon said one sprag so as to maintain the contact surfaces thereof in constant engagement with said cylindrical surfaces of said inner and outer races, and having a second spring arm engaging the sprag adjacent said one sprag so as to exert on the latter a pressure directed substantially in a radial direction of said races so that the torque imparted to each sprag by the spring mounted thereon will be independent of the torque exerted by the remaining springs on the remaining sprags, each sprag including the coil spring mounted thereon having a center of gravity located on said common axis so that the torque imparted to each sprag will be independent of centrifugal forces acting on the sprags during rotation of the clutch.

5. A one-way sprag type clutch comprising, in combination, an outer race having a cylindrical inner surface; an inner race having a cylindrical outer surface, said surfaces defining between themselves an annular space; a plurality of tiltable sprags located in said annular space next to each other and having each inner and outer contact surfaces respectively abutting against said cylindrical inner and outer race surfaces, and each having a pair of oppositely arranged cylindrical abutting surfaces respectively abutting against corresponding abutting surfaces of adjacent sprags, said outer contact surface and said pair of oppositely arranged abutting surfaces having a common axis of curvature and each of said sprags being formed with a cylindrical bore extending along said axis and with an elongated slot extending in an end face of said sprag transversely to opposite sides of said bore and having a pair of side faces; and a single helical coil spring mounted on each of said sprags in said bore and tightly engaging with all the coils thereof the cylindrical bore surface, said coil spring having a first spring arm engaging the sprag on which said spring is mounted at one of said side faces of said slot at a location distant from said common axis for imparting a torque upon said one sprag so as to maintain the contact surfaces thereof in constant arrangement with said cylindrical surfaces of said inner and outer races, and having a second spring arm extending between said side faces into the bore of the sprag adjacent said one sprag so as to exert on the latter a pressure directed substantially in a radial direction of said races so that the torque imparted to each sprag by the spring mounted thereon will be independent of the torque exerted by the remaining springs on the remaining sprags, each sprag including the coil spring mounted thereon having a center of gravity located on said common axis so that the torque imparted to each sprag will be independent of centrifugal forces acting on the sprags during rotation of the clutch.

6. A one-way sprag type clutch comprising, in combination, an outer race having a cylindrical inner surface; an inner race having a cylindrical outer surface, said surfaces defining between themselves an annular space;

a plurality of tiltable sprags located in said annular space next to each other and having each inner and outer contact surfaces respectively abutting against said cylindrical inner and outer race surfaces, and each having a pair of oppositely arranged cylindrical abutting surfaces respectively abutting against corresponding abutting surfaces of adjacent sprags, said outer contact surface and said pair of oppositely arranged abutting surfaces having a common axis of curvature and each of said sprags being formed with a cylindrical projection projecting coaxial with said common axis from one end face of said sprag; and a single helical coil spring mounted on each of said sprags tightly wound about said projection and having a first spring arm engaging the sprag on which said spring is mounted for imparting a torque upon said one sprag so as to maintain the contact surfaces thereof in constant engagement with said cylindrical surfaces of said inner and outer races, said first spring arm having an engaging end portion extending substantially parallel to said common axis and engaging the sprag on which said spring is mounted at an outer surface thereof facing the sprag next to and at one side of said one sprag, said coil spring having a second spring arm engaging the coils of the spring wound on the projection of the sprag next to the other side of said one sprag so as to exert on the latter a pressure directed substantially in a radial direction of said races so that the torque imparted to each sprag by the spring mounted thereon will be independent of the torque exerted by the remaining springs on the remaining sprags, each sprag including the coil spring mounted thereon having a center of gravity located on said common axis so that the torque imparted to each sprag will be independent of centrifugal forces acting on the sprags during rotation of the clutch.

7. A one-way sprag type clutch comprising, in combination, an outer race haivng a cylindrical inner surface; an inner race having a cylindrical outer surface, said surfaces defining between themselves an annular space; a plurality of titlable sprags located in said annular space next to each other and having each inner and outer contact surfaces respectively abutting against said cylindrical inner and outer race surfaces, and each having a pair of oppositely arranged cylindrical abutting surfaces respectively abutting against corresponding abutting surfaces of adjacent sprags, said outer contact surface and said pair of oppositely arranged abutting surfaces having a common axis of curvature and each of said sprags being formed with a cylindrical projection projecting coaxial with said common axis from one end face of said sprag, said abutting surfaces being constituted by an annular rim formed at the free end of said cylindrical projection; and a single coil spring mounted on each of said sprags tightly wound about said projection between said end face and said annular rim and having a first spring arm engaging the sprag on which said spring is mounted for imparting a torque upon said one sprag so as to maintain the contact surfaces thereof in constant engagement with said cylindrical surfaces of said inner and outer races, and having a second spring arm engaging the sprag adjacent said one sprag so as to exert on the latter a pressure directed substantially in a radial direction of said races so that the torque imparted to each sprag by the spring mounted thereon will be independent of the torque exerted by the remaining springs on the remaining sprags.

8. A one-way sprag as defined in claim 6, in which the end portion of said second spring arm is bent so as to extend substantially parallel to the axis of said spring coil on said adjacent sprag and transverse to the coil turns of said adjacent spring.

9. A one-way sprag type clutch comprising, in combination, an outer race having a cylindrical inner surface; an inner race having a cylindrical outer surface, said surfaces defining between themselves an annular space; a set of tiltable sprags located in said annular space next to each other and having each inner and outer contact surfaces respectively abutting against said cylindrical inner and outer race surfaces, and having each a pair of oppositely arranged cylindrical abutting surfaces respectively abutting against the corresponding abutting surfaces of adjacent sprags, said outer contact surface and said pair of oppositely arranged abutting surfaces having a common axis of curvature and each of said sprags being formed with at least one cylindrical projection projecting coaxially with said common axis from at least one end face of said sprag and having an annular rim formed at the free end of the cylindrical projection; and a single helical coil spring mounted on each of said sprags tightly wound about the projection between said end face and said annular rim and having a first spring arm engaging the sprag on which said spring is mounted for imparting a torque upon said one sprag so as to maintain the contact surfaces thereof in constant engagement with said cylindrical surfaces of said inner and outer races, and having a second spring arm engaging the sprag adjacent said one sprag so as to exert on the latter a substantially radially directed pressure along a line passing through said common axis so that the torque imparted to each sprag by the spring mounted thereon will be independent of the torque exerted by the remaining sprags on the remaining sprags, each sprag including the coil spring mounted thereon having a center of gravity located on said common axis so that the torque imparted to each sprag will be independent of centrifugal forces acting on the sprags during rotation of the clutch.

References Cited in the file of this patent

UNITED STATES PATENTS

| 1,356,007 | Pasquariello | Oct. 19, 1920 |
| 2,599,793 | Warner | June 10, 1952 |
| 2,901,072 | Mauer et al. | Aug. 25, 1959 |
| 2,954,855 | Lund | Oct. 4, 1960 |

FOREIGN PATENTS

| 508,880 | Belgium | Feb. 15, 1952 |